United States Patent [19]
Fortune

[11] 3,807,444
[45] Apr. 30, 1974

[54] CHECK VALVE

[75] Inventor: Ronald Fortune, Hamilton, Ontario, Canada

[73] Assignee: Canada Valve Limited, Ontario, Canada

[22] Filed: Oct. 10, 1972

[21] Appl. No.: 295,940

[52] U.S. Cl. ....... 137/512.1, 137/512.15, 137/515.5, 137/525, 137/525.3
[51] Int. Cl. ............................................ F16k 15/14
[58] Field of Search ............ 137/512.1, 512.15, 515, 137/515.3, 515.5, 515.7, 525, 525.3; 251/360

[56] References Cited
UNITED STATES PATENTS

| | | | |
|---|---|---|---|
| 2,897,835 | 8/1959 | Philippe | 137/512.15 X |
| 3,664,759 | 5/1972 | Biheller | 137/525.3 X |
| 2,908,283 | 10/1959 | Kiffer et al. | 137/515.5 X |
| 3,613,720 | 10/1971 | Welch | 137/525.3 X |
| 2,434,734 | 1/1948 | Buschmann | 137/525.3 |
| 3,527,242 | 9/1970 | Ansite | 137/512.15 X |
| 3,395,858 | 8/1968 | Spencer et al. | 137/512.15 X |

*Primary Examiner*—William R. Cline
*Attorney, Agent, or Firm*—Hill, Sherman, Meroni, Gross & Simpson

[57] ABSTRACT

A multi-ported check valve in which the valve ports are arranged concentrically on the valve seat and the valve closure members are made of flexible material, such as elastomers. The valve body is made in two parts with abutting flanges adapted to be locked together with a portion of the edge of each closure member locked therebetween. The remainder of the closure member is free to flex to open or closed position when pressure is exerted from the up-stream side or back pressure is exerted from the down stream side, respectively. The valve has relatively few parts, is simple and inexpensive to manufacture and avoids slamming upon valve closure.

12 Claims, 6 Drawing Figures

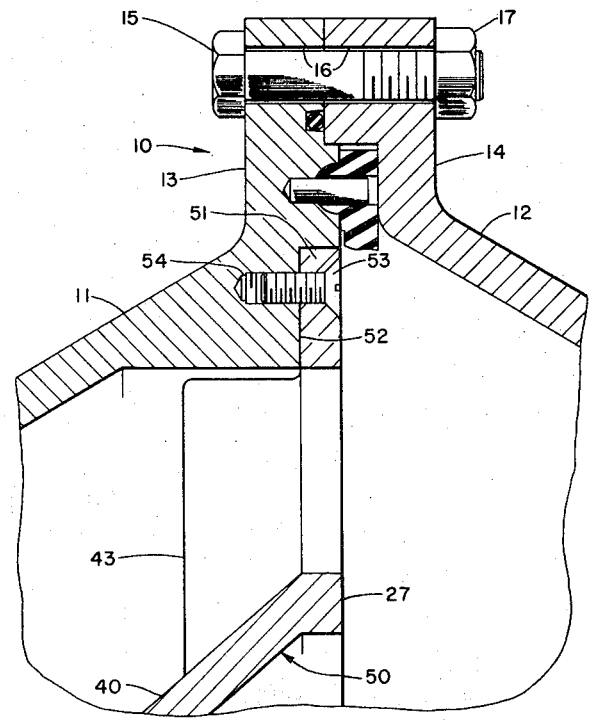
FIG. 6
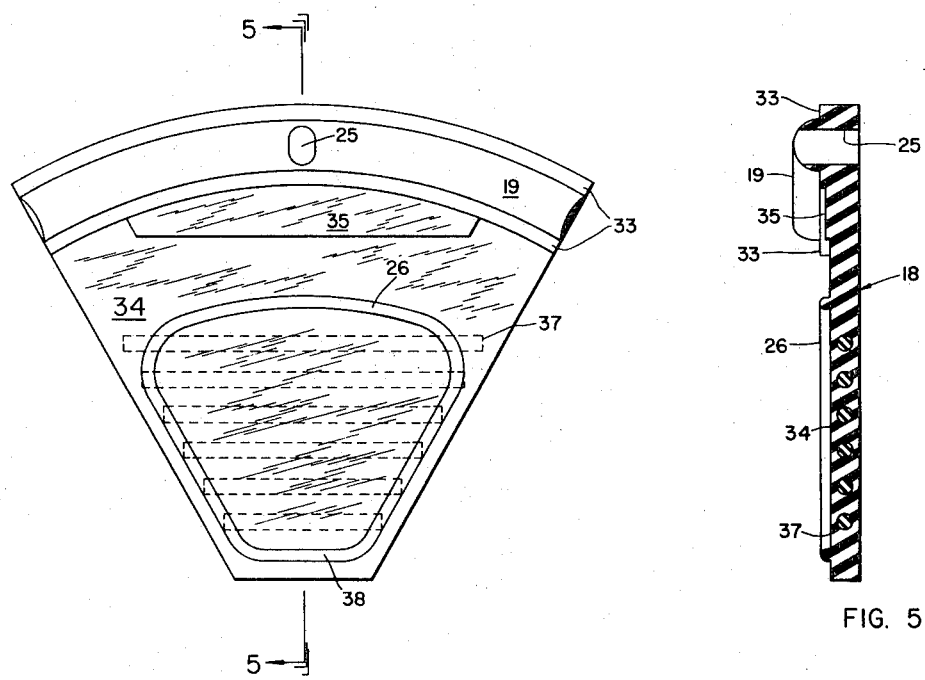
FIG. 4
FIG. 5

CHECK VALVE

DESCRIPTION OF THE PRIOR ART

Swing check valves are known to have swinging or tilting discs which, because of the suspended weight of the disc, cause objectionable slamming of the disc against the seat of the valve resulting in severe vibration which, in turn, is liable to damage the pipes in the water lines of the pumping system. In addition the disc is suspended from a shaft within the valve body necessitating bearings and O-ring seals. In many instances the disc shaft is extended beyond the outside of the valve to accommodate a lever and spring mechanism to assist closing of the disc under low pressure.

The problem of swing check slam on high back pressure, such as steep gradient pipe lines or pump manifolding where pumps are shut down individually, is met by the addition of levers and weights, or springs, to the clapper arm assembly. By means of such devices the disc is brought to the seated position as soon as flow stops and before back flow can commence. Presumably, in this way, dangerous back surges, slam, and water hammer are reduced.

SUMMARY OF THE INVENTION

Briefly, the present invention is a new and improved type of check valve with a body of concentric design, constructed in two half sections and fastened at its periphery and having a plurality of radially disposed flexible flap valves firmly clamped therebetween at their outermost extremities but individually free to flex towards and away from the valve seat in cooperation with the direction of fluid flow passed through the valve. The flap valves cooperate with a plurality of radially disposed ports within the valve body to effect quiescent closing under all pressures.

The object of this invention is to provide a new and improved valve having relatively few operating parts, which is relatively inexpensive to manufacture and which prevents objectionable slamming.

BRIEF DESCRIPTION OF THE DRAWINGS

Further advantage and uses of the invention will become more apparent when considered in view of the following detailed description and drawings, in which

FIG. 4 is a detailed front elevation of the resilient flap valve showing the arcuate locking key and the contour of the O-ring seal.

FIG. 5 is a cross section of FIG. 4 on the line 5—5 revealing the reinforcement bars.

FIG. 6 is a fragmentary cross-section, corresponding to FIG. 1, of a modified construction embodying a removable port manifold.

DESCRIPTION OF PREFERRED EMBODIMENTS

Figure 1:
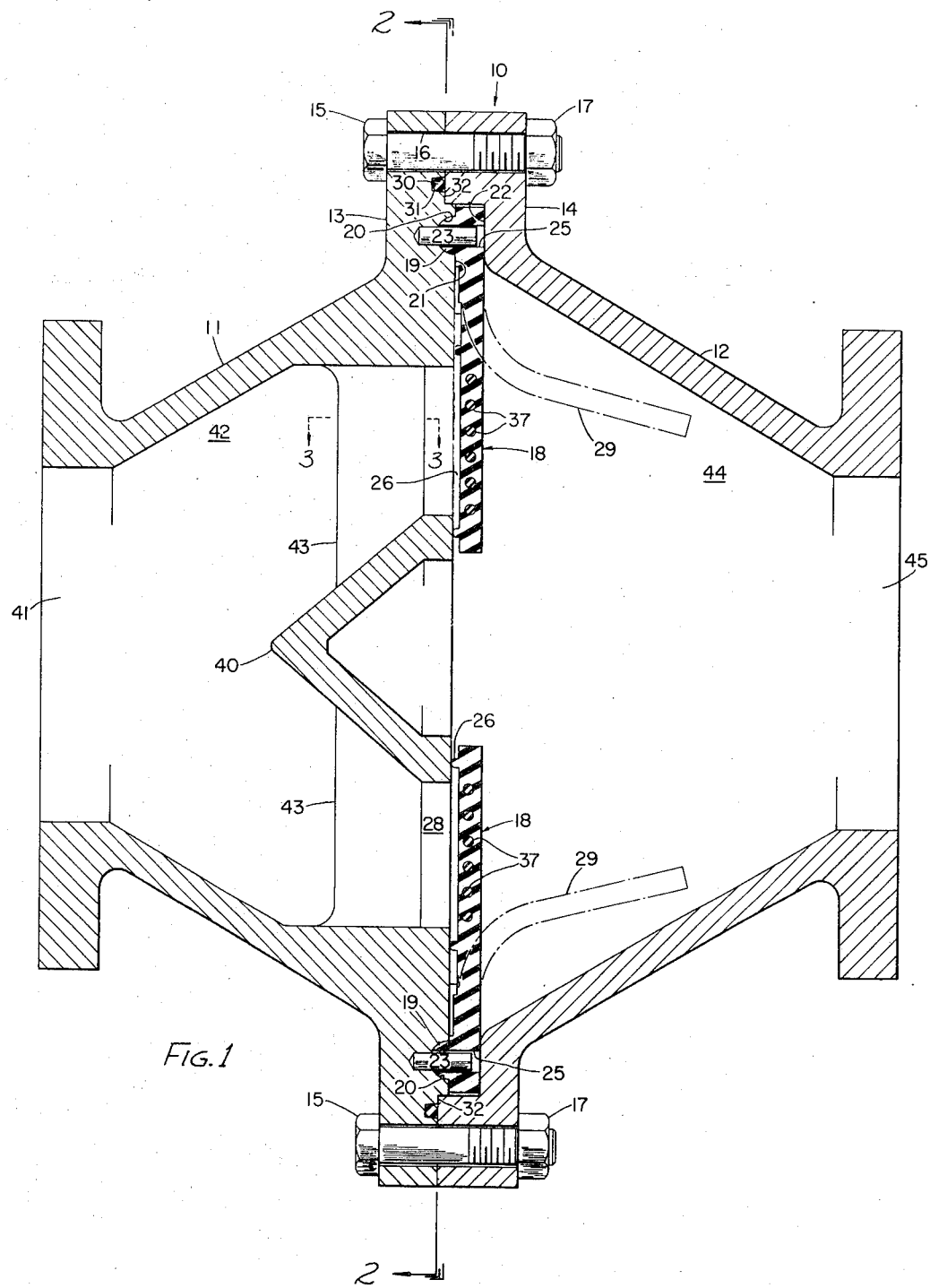
FIG. 1 is a longitudinal cross section taken on the line 1—1 of FIG. 2 showing the flap valves in the closed position. Dotted lines indicate the extent to which they flex when in the open position.

In the drawings the body 10 is constructed in two generally conical contoured half sections 11 and 12 bolted together by two matched flanges 13 and 14 by the bolts 15 which pass through holes 16 and are fastened by nuts 17. The flexible flap valves 18 are clamped rigidly at their outermost extremity as the arcuate locking keys 19 molded as part of the valves 18, mesh into the annular groove 20 formed on the inner face 21 of flange 13 and are locked firmly between the faces 21 and 22. The pins 23 driven into holes 24, evenly spaced around flange 13 and extending partway into the flange from groove 20, are employed to accurately locate the segmental flap valves 18 around face 21. The flap valves each have a hole 25 extending through key 19 for accurate registration on the pin 23 to facilitate assembly.

When the valves 18 are in closed position, the beads or O-ring seals 26 of the flap valves 18 seat against the segmental plate or seat 27 of the valve, blocking off the ports 28 to effect a tight seal. In the open position as indicated by the dotted lines 29 FIG. 1, the segmental flap valves flex outwardly under pressure from the pump to unblock the ports 28.

An O-ring seal 30 contained in a circular groove 31 in face 21 bears against face 32 of flange 14 to prevent leakage of fluid between the connecting flanges 13 and 14.

Figure 2:
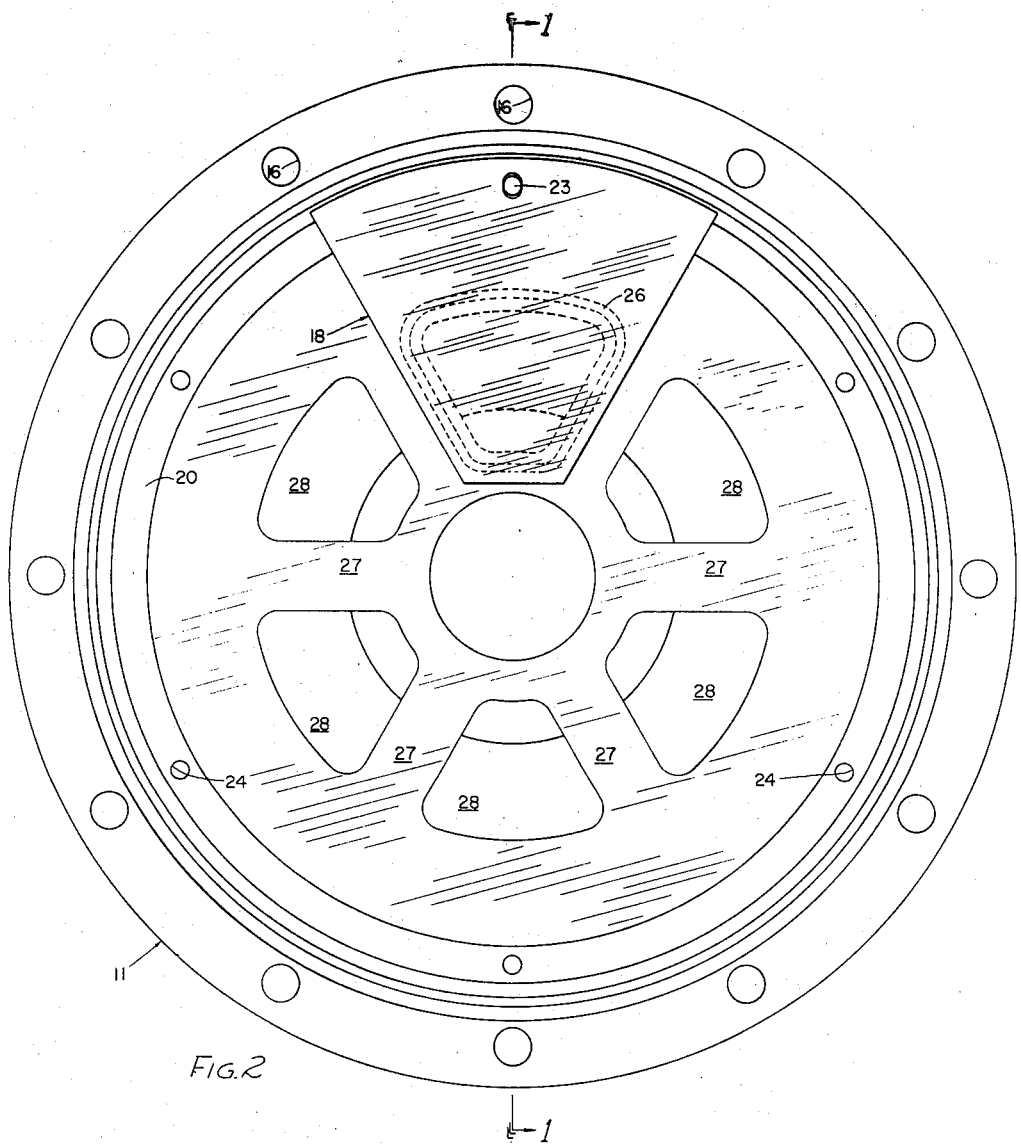
FIG. 2 is an end elevation of the upstream half of the valve taken on the line 2—2 of FIG. 1 with the downstream half of the valve removed to more clearly show the radially disposed ports in the valve.
Figure 3:
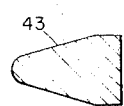
FIG. 3 is a fragmentary cross section taken along line 3—3 of FIG. 1 showing the contour of flow divider vanes.

Referring to FIG. 4, the flap valves 18 are of a generally circular sector and while there are six ports 28 illustrated in FIG 2 it should be obvious that there could be more or less than six ports and six flap valves. As clearly shown in FIG. 5, the arcuate locking head or key 19 protrudes from the clamping rim 33 forming part of the valve 18 while the face 34 is stepped back from the clamping rim. A stiffening web 35 molded integrally with valve 18 contiguous to rim 33 increases the stiffness at this location and, immediately below it, the flap valve is thinner to provide flexibility and to permit the valve to flex and reflex. The bead or O-ring seal 26 is integrally moulded on the face 34 of the flap valve 18 and conforms to and follows around the outside contour of the port 28 as shown in FIG. 2.

Preferably, reinforcement rods 37 are integrally moulded into the flap valves parallel to the portion 38 of O-ring seal 26 in order to provide freedom of flexural displacement as the flap valve flexes and reflexes between open and closed positions. The metal reinforcement rods 37 straddle the ports 28 and support the flap valve, from inward collapse against sudden back pressure as the valve returns to the closed seated position.

Although steel rods are shown as one preferred method of reinforcement, springs, fabric and other means of reinforcement may be employed to stiffen the elastomeric flap valve. Springs would serve to urge the valve toward the closed position.

A port manifold 27 is cast integrally as part of section 11. Manifold 27 is formed with parts 28 and conical-shaped center 40, with its apex extending toward inlet 41.

In operation, with the pump started, fluid flow from the inlet or upstream end 41 diverges through the expanded chamber 42 and is directed past the diverging cone 40 and the diverging flow dividers 43 cast integrally with plate 27 between the concentric manifold of ports 28, to open the flap valves 18 as indicated by the dotted lines 29 FIG. 1. After passing through the ports 28 the fluid flow converges through the expanded downstream chamber 44 to continue the flow through the outlet or downstream end 45. When the pump shuts down, back pressure is caused by the sudden reversal of flow through the downstream end 45 causing the flap valves 18 to reflex quiescently against the seat 27 to the closed position.

The valves 18 may be made of any suitable elastomeric material such as natural rubber, GRS, Neoprene, Thiokol, nitrile rubber and butyl rubber. It will be apparent that any valve 18 can be readily replaced if it becomes worn.

Referring to FIG. 6 there is illustrated a modified construction for providing a detachable port manifold. The central cone 40 and flow direction vanes or flow dividers 43 form a separate casting 50 having a continuous peripheral flange 51. The half body 11 is recessed at 52 to receive the outer flange 51 and the complete detachable port manifold casting is fastened to the half body 11 by means of flat head machine screws 53 which are screwed into tapped holes 54. Such a modified construction is suitable for attaching a brass or stainless steel port manifold and may be coated with epoxy, plastic or rubber to provide for protection against corrosive and abrasive fluids.

I claim:

1. A multi-ported valve comprising a body member having an inlet and an outlet, a multi-ported valve seat adapted to straddle the passageway from inlet to outlet, said valve seat being formed with an imperforate conical-shaped center surrounded by valve ports, the apex of said center extending in the direction of said inlet and a separate flexible valve closure member for each port fastened in leak-proof relation with said seat along a portion of the edge of said member, each closure member covering the entire area of its mating port when in closed position with the portion of the closure member covering the port being free to flex away from the port upon application of up-stream pressure and to reflex into leak-proof relation with said seat upon application of back pressure.

2. A check valve in acccordance with claim 1 in which said body is formed in two parts with outwardly extending flanges adapted to be locked together with a portion of the edge of each valve closure member held in leak-proof relation between said flanges.

3. A check valve in accordance with claim 2 in which said ports are concentrically arranged on said seat.

4. A check valve in accordance with claim 3 in which one part of said valve body has an abutting flange face formed with an annular groove and said valve closure members are formed with an arcuate-shaped key adapted to fit in said groove to form a leak-proof seal when the body is assembled.

5. A check valve in accordance with claim 4 in which said one part of the body is formed with a plurality of spaced holes extending inwardly from said groove, pins are adapted to be mounted in said holes, each valve closure member having a hole passing therethrough at the locus of the key whereby to accurately locate the closure member with respect to its mating port when said pins are inserted in said valve closure member holes.

6. A check valve in accordance with claim 2 in which said multi-ported valve seat is cast integrally as part of one of said two body parts.

7. A check valve in accordance with claim 2 in which said multi-ported valve seat is formed separately from said body parts and is adapted to be removably fastened to one of said parts.

8. A check valve in accordance with claim 1 in which said valve seat is formed with fluid dividers on the upstream side of the seat in order to divide said fluid among said ports.

9. A check valve in accordance with claim 8 in which said fluid dividers have walls diverging toward said ports and said dividers are located between said ports, the walls of each divider being coincident with a portion of the edge of the two most adjacent ports.

10. A multi-ported check valve in accordance with claim 1 in which said closure members are formed with a stiffening web contiguous to the portion of the edge fastened in leak-proof relation with said seat, the portion of said closure members straddling said ports are moulded with reinforcing material, and the portion of said closure members between the stiffening web and reinforced portion is more flexible than the portion formed with said stiffening web.

11. A multi-port check valve in accordance with claim 10 in which said closure members are formed with beads on the side engaging said valve seat, the bead on each closure member surrounding its mating port and being adapted to engage said seat in sealing relationship therewith.

12. A multi-port check valve in accordance with claim 10 in which the valve closure members are molded from elastomeric material and the reinforcing material is a plurality of spaced parallel metal rods embedded in the elastomeric material.

* * * * *